March 25, 1952     F. R. ELMORE     2,590,391
ELECTRIC SAFETY WALL BOX
Filed Aug. 13, 1948

Frank R. Elmore
INVENTOR.

BY *Clarence A. O'Brien*
*and Harvey B. Jacobson*
Attorneys

UNITED STATES PATENT OFFICE 2,590,391

ELECTRIC SAFETY WALL BOX

Frank R. Elmore, Borger, Tex.

Application August 13, 1948, Serial No. 44,057

1 Claim. (Cl. 220—3.6)

This invention relates generally to an improved mounting or anchoring arrangement for junction or outlet boxes, which are conventionally employed to receive electrical terminals.

The primary object of this invention is to provide an improved and novel securing means for positioning the switch or outlet boxes securely and firmly in position within a wall opening.

Another important object of this invention is to provide an outlet box and securing means therefor, which will permit installation of the outlet box in an existing structure, the outlet box being detachably anchored within a wall opening and firmly secured on plastered or fibre board walls or the like.

A meritorious feature of this invention resides in the provision of an open face box-like receptacle, having oppositely extending flanges adapted to engage the outer surface of a wall and a pair of bracket members detachably received in and inserted through the side walls of the receptacle for cooperative positioning with respect to the flanges on the inner surface of the walls.

These and ancillary objects and other meritorious features which will become more fully apparent upon a perusal of the following description are attained by this invention, a preferred embodiment of which has been illustrated in the accompanying drawings, wherein.

Figure 1:
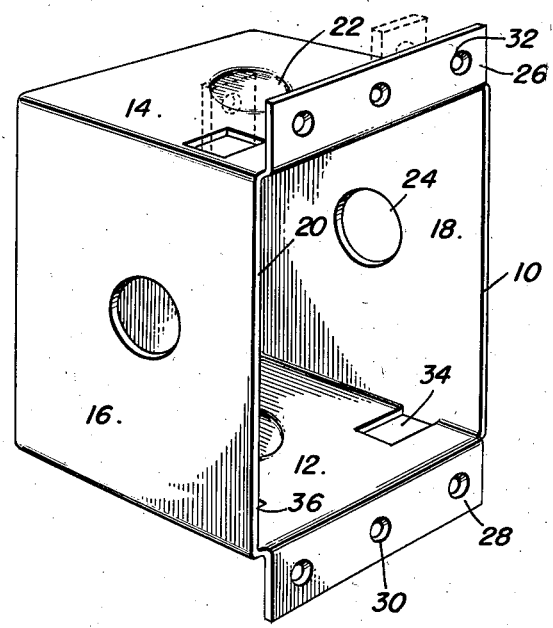
Figure 1 is a view in perspective of an outlet box or a junction box, constructed in accordance to the principles of this invention.

The reference numeral 10, with respect to the drawing, comprises a conventional switch box, having a first pair of opposed side walls 12 and 14 and a second pair of opposed side walls 16 and 18 joined by a back wall 20, with an oppositely disposed open face. The side walls are provided with the usual circular or disc-shaped weakened portions 22, adapted to be knocked out to form opposed conductor inlets 24, so as to receive the end of electrical wiring intended to be spliced together.

Figure 3:
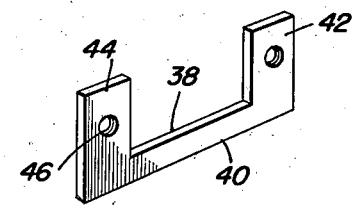
Figure 3 is a perspective view of the socket member adapted to engage the inner surface of the wall.

The opposed vertically aligned side walls 12 and 14 are provided with oppositely extending flanges 26 and 28, which may extend the width of the side walls or may be formed in a series of spaced bars. The flanges are suitably apertured, as at 30 and 32 to receive conventional securing means. The opposed side walls 12 and 14 are formed with aligned substantially rectangular openings 34 and 36, which are disposed in vertical alignment and positioned adjacent the side walls 16 and 18, as seen in Figure 1. A bracket member of substantially U-shape, 38, as seen in Figure 3, is adapted to be detachably received within the inner surfaces of the side walls 12 and 14 and disposed through the aligned apertures 34 and 36. The attaching bracket comprises a body portion 40 having a pair of lateral parallel legs or attaching members 42 and 44 which are centrally apertured as at 46.

The body portion 40 is adapted to engage the inner surfaces of the side walls 12 and 14, while the laterally extending legs 42 and 44 are adapted to be inserted or positioned through the transversely spaced apertures 34 and 36 which are formed in oppositely disposed pairs.

Figure 2:
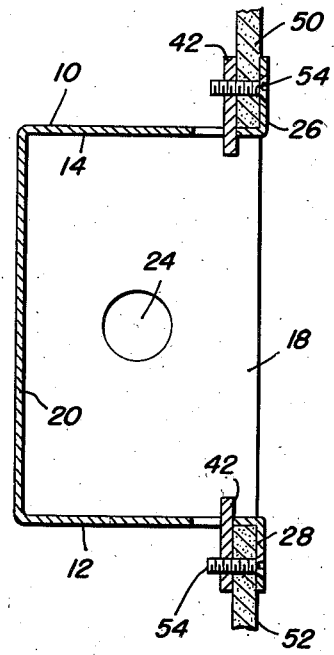
Figure 2 is a cross sectional view, illustrating the outlet box in position within a wall opening.

In this respect, attention is directed to Figure 2, wherein it is to be noted that the junction box is disposed within a wall opening defined by a pair of wall boards 50 and 52. The extending flanges 26 and 28 are disposed on the outer surface of the wall boards and the bracket members are secured on the inner surfaces. Suitable securing means such as fastening screws 54 are employed and are secured within the apertures 46 and the brackets 38 and through the apertures 30 and 32 in the flanges to secure the junction box within the wall opening.

The extending parallel legs 42 and 44 of the bracket members are inserted through the slots or openings 34 and 36 and the apertures 46 coincide or align with the apertures in the flanges so that the securing members are easily and conveniently positioned through the apertures to clamp the flanges and the bracket legs on the inner and outer surfaces of the walls respectively.

In securing the box to an existing structure, an opening is formed in the wall board and the box is disposed in the wall opening with the flanges limiting the placement of the box upon engagement of the outer surfaces of the wall.

A drill is then employed to form openings in the wall board and the brackets or complementary plates 38 are inserted in the slots in the side walls. Securing elements are positioned through the flanges and bracket legs and are disposed in the countersunk bores in the flanges. It is to be noted that the means herein provided for securing a junction box within a wall opening is dependable and enables a junction box to be easily attached and removed.

However, since many other modifications and purposes of this invention become readily apparent to those skilled in the art upon a perusal of the foregoing description, it is to be understood that certain changes in style, size and components may be effected without a departure from the spirit of the invention and within the scope of the appended claim.

Having described the invention, what is claimed as new is:

An electrical outlet wall box comprising a back wall, upper and lower walls having vertical sides connected therebetween and an open front end, oppositely directed vertically projecting flanges extending from the front edge of said upper and lower walls, said flanges lying in the same plane and being perpendicular to said upper and lower walls, horizontally spaced vertically aligned apertures in said upper and lower walls, said apertures disposed adjacent said sides and flange, U-shaped brackets having elongated flat central web portions and outwardly projecting leg members lying in a plane of the web portions, the apertures in said upper and lower walls adjustably receiving said legs whereby said legs are in parallel disposition relative to said flanges, aligned apertures in each of the adjacent flanges and bracket legs and means for securing a wall board between said legs and flanges.

FRANK R. ELMORE.

REFERENCES CITED

The following references are of record in the file of this patent:

UNITED STATES PATENTS

| Number | Name | Date |
| --- | --- | --- |
| 916,436 | Greenfield | Mar. 30, 1909 |
| 1,265,744 | Canfield | May 14, 1918 |
| 1,519,927 | Polhemus | Dec. 16, 1924 |
| 1,893,357 | Carlson | Jan. 3, 1933 |
| 2,044,650 | Thompson | June 16, 1936 |